(12) United States Patent
Tung

(10) Patent No.: US 10,432,479 B2
(45) Date of Patent: Oct. 1, 2019

(54) SYSTEM AND METHOD FOR REDUCING MANAGEMENT PORTS OF A MULTIPLE NODE CHASSIS SYSTEM

(71) Applicant: Quanta Computer Inc., Taoyuan (TW)

(72) Inventor: Yen-Ping Tung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 512 days.

(21) Appl. No.: 15/140,259

(22) Filed: Apr. 27, 2016

(65) Prior Publication Data

US 2017/0317892 A1    Nov. 2, 2017

(51) Int. Cl.
G06F 15/173 (2006.01)
H04L 12/24 (2006.01)
H04L 12/931 (2013.01)

(52) U.S. Cl.
CPC .......... *H04L 41/26* (2013.01); *H04L 41/044* (2013.01); *H04L 41/24* (2013.01); *H04L 49/00* (2013.01)

(58) Field of Classification Search
CPC . H04L 12/56; H04L 29/0653; H04L 41/0893; H04L 45/38; H04L 45/74; H04W 84/12; H04W 24/08; H04W 88/02; H04W 12/06; H04W 4/80; H04W 72/0453
See application file for complete search history.

(56) References Cited

U.S. PATENT DOCUMENTS

| 9,819,532 B2 | 11/2017 | Zhou et al. |
| 2003/0130969 A1* | 7/2003 | Hawkins ................. H04L 12/66 706/15 |
| 2009/0073896 A1* | 3/2009 | Gillingham ........... G06F 9/5061 370/255 |

(Continued)

FOREIGN PATENT DOCUMENTS

| CN | 102187640 A | 9/2011 |
| CN | 102375787 A | 3/2012 |

(Continued)

OTHER PUBLICATIONS

JP Office Action for Application No. 2017-082354, dated Mar. 6, 2018, w/ First Office Action Summary.

(Continued)

*Primary Examiner* — Michael A Keller
*Assistant Examiner* — Thao D Duong
(74) *Attorney, Agent, or Firm* — Nixon Peabody LLP; Zhou Lu

(57) ABSTRACT

Systems, methods, and computer-readable storage devices for reducing the amount of management ports (and associated cabling) for a top-of-rack server environment. Whereas other server management configurations have cabling connecting each node in multiple multi-node chassis in a server rack to a top-of-rack, systems configured as described herein designate a single node as a point of communication for the multi-node chassis. The designated node forwards communications for all nodes in the chassis to a chassis management controller, which acts as a distribution point for all (Continued)

communications within the multi-node chassis, with the benefit of only a single connection being required between the multi-node chassis and the top of rack switch.

16 Claims, 6 Drawing Sheets

(56) References Cited

U.S. PATENT DOCUMENTS

| | | | |
|---|---|---|---|
| 2013/0173757 A1* | 7/2013 | Peng | H04L 12/1859 |
| | | | 709/219 |
| 2013/0173810 A1 | 7/2013 | Subramaniam | |
| 2014/0032641 A1* | 1/2014 | Du | H04L 43/0817 |
| | | | 709/203 |
| 2015/0074471 A1* | 3/2015 | Sainath | G06F 11/0787 |
| | | | 714/57 |
| 2017/0083457 A1* | 3/2017 | Khemani | G06F 12/1408 |

FOREIGN PATENT DOCUMENTS

| | | |
|---|---|---|
| CN | 105407028 A | 3/2016 |
| EP | 2503735 A2 | 9/2012 |
| JP | 2007280422 A | 10/2007 |

OTHER PUBLICATIONS

Extended European Search Report for EP Application No. 17167365.0, dated Sep. 14, 2017.
CN Office Action for Application No. 201610571212.4, dated Apr. 1, 2019, w/ First Office Action Summary.
CN Search Report for Application No. 201610571212.4, dated Apr. 1, 2019, w/ First Office Action.

\* cited by examiner

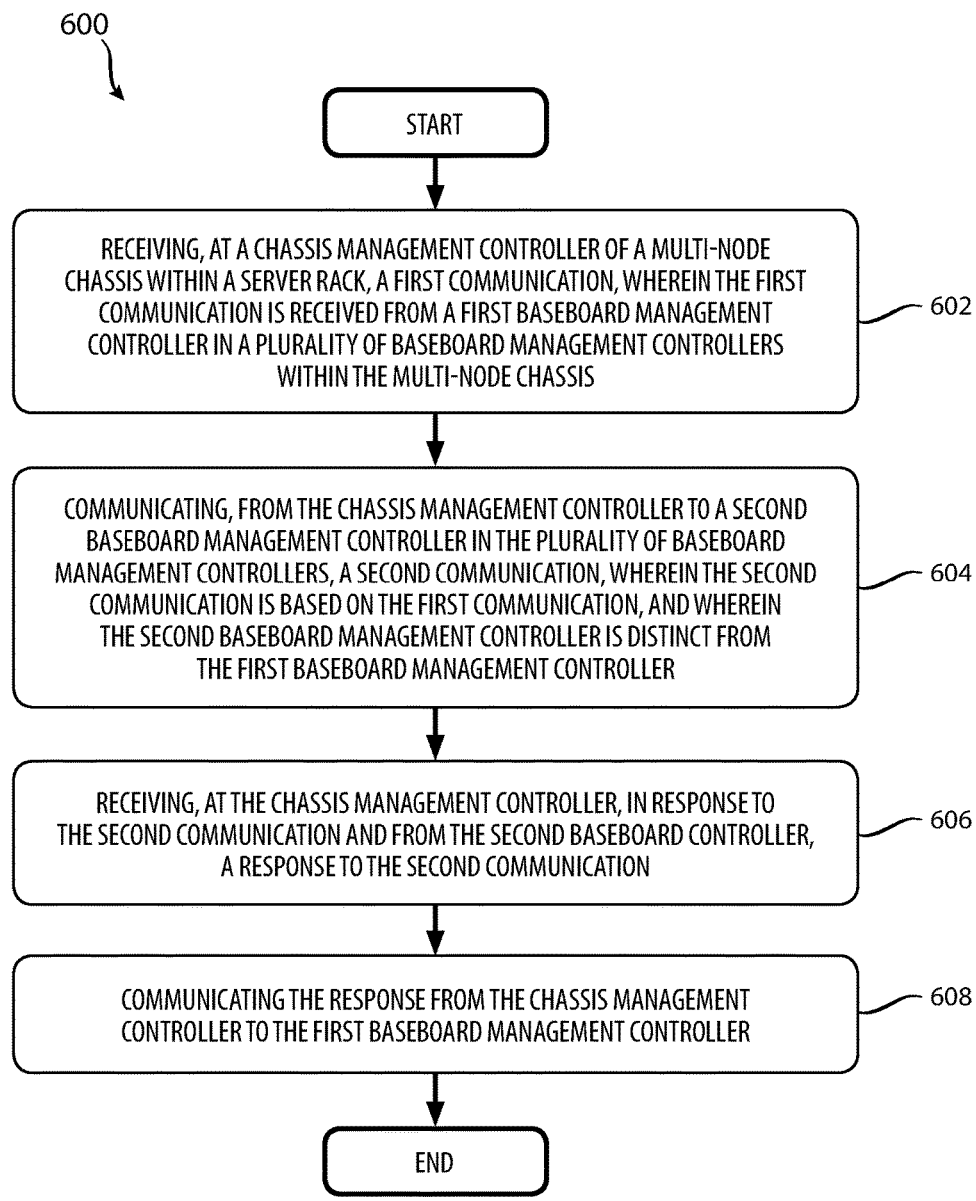

SYSTEM AND METHOD FOR REDUCING MANAGEMENT PORTS OF A MULTIPLE NODE CHASSIS SYSTEM

TECHNICAL FIELD

The present disclosure relates to port management in Top-Of-Rack (TOR) server management, and more specifically to producing a savings cost by reduction of management ports in a multiple-node chassis system.

BACKGROUND

In a multiple node chassis system utilizing a TOR switch, each node of each multi-node chassis within a rack must have a management port for communicating with the TOR switch. For example, a 4U8N chassis (a 4 unit high chassis having 8 nodes) will have 8 management ports—one for each node. Each management port must then be connected to the TOR switch, resulting in a costly and complex wiring system to ensure port management. For example, as illustrated in FIG. 2 and further described below, if a single rack has 10 chassis, the TOR switch communicating with each management port would require 80 ports (10 chassis×8 management ports/chassis).

SUMMARY

The methods, systems, and computer-readable storage devices disclosed herein can reduce the total number of management ports required, thereby saving on costs and reducing the complexity of a Top-of-Rack (TOR) multi-chassis system. As an example, a chassis management controller of a multi-node chassis within a server rack can be configured to perform a method including receiving, at the chassis management controller, a first communication, wherein the first communication is received from a first baseboard management controller in a plurality of baseboard management controllers within the multi-node chassis. The chassis management controller can then communicate to a second baseboard management controller in the plurality of baseboard management controllers, a second communication, wherein the second communication is based on the first communication, and wherein the second baseboard management controller is distinct from the first baseboard management controller. The chassis management controller receives, in response to the second communication and from the second baseboard controller, a response to the second communication and communicates the response from the chassis management controller to the first baseboard management controller.

Systems, devices, and implementations of the concepts disclosed herein reduce the number of nodes within a multi-node chassis which have management ports in contact with the TOR switch. By only having a single node in contact with the TOR switch, rather than every node within a multi-node chassis in contact with the TOR, the complexity and cost of the rack can be reduced.

BRIEF DESCRIPTION OF THE DRAWINGS

Various embodiments in accordance with the present disclosure will be described with reference to the drawings, in which:

FIG. 6 illustrates an example method embodiment.

DETAILED DESCRIPTION

Various embodiments or aspects of the disclosure are described in detail below. While specific implementations are described, it should be understood that this is done for illustration purposes only. Other components and configurations may be used without parting from the spirit and scope of the disclosure. Moreover, it should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

The present disclosure addresses improvements to TOR systems by reducing the number of required management ports which are in communication with the TOR switch. A brief introductory description of a basic general purpose system or computing device in FIG. 1 which can be employed to practice the concepts, methods, and techniques disclosed is illustrated. A more detailed description of how the systems, methods, and computer-readable storage devices reduce the number of required management ports will then follow, accompanied by multiple variations and embodiments. These variations shall be described herein as the various embodiments are set forth. The disclosure now turns to FIG. 1.

Figure 1:
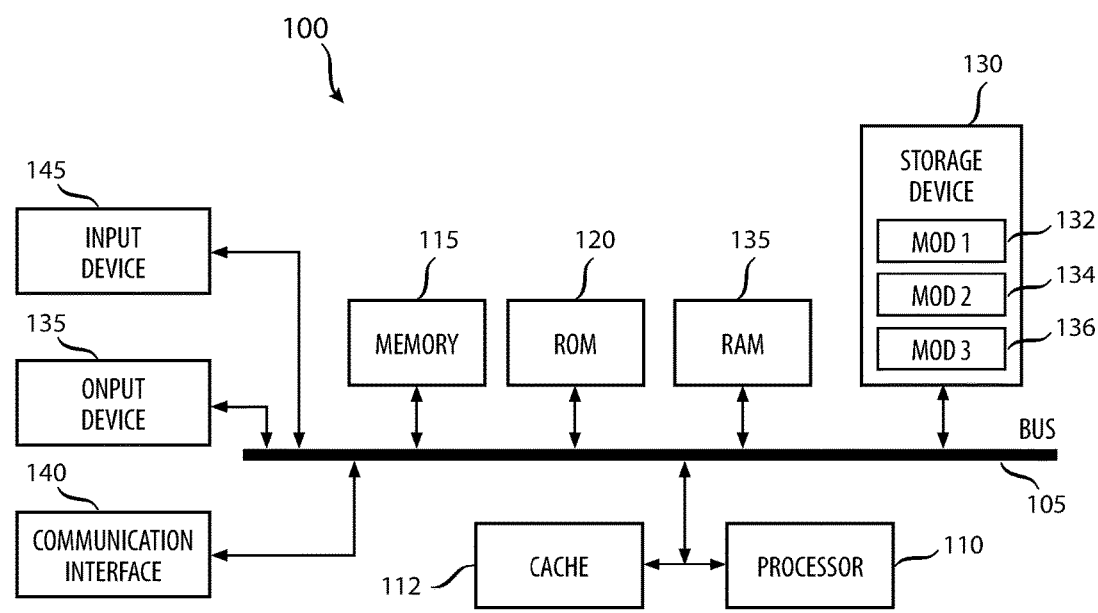
FIG. 1 illustrates an example system embodiment.

With reference to FIG. 1, an exemplary system and/or computing device 100 includes a processing unit (CPU or processor) 110 and a system bus 105 that couples various system components including the system memory 115 such as read only memory (ROM) 120 and random access memory (RAM) 135 to the processor 110. The system 100 can include a cache 112 of high-speed memory connected directly with, in close proximity to, or integrated as part of the processor 110. The system 100 copies data from the memory 115 and/or the storage device 130 to the cache 112 for quick access by the processor 110. In this way, the cache provides a performance boost that avoids processor 110 delays while waiting for data. These and other modules can control or be configured to control the processor 110 to perform various operations or actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability. The processor 110 can include any general purpose processor and a hardware module or software module, such as module 1 132, module 2 134, and module 3 136 stored in storage device 130, configured to control the processor 110 as well as a special-purpose processor where software instructions are incorporated into the processor. The processor 110 may be a self-contained computing system, containing multiple cores or processors, a bus, memory controller, cache, etc. A multi-core processor may be symmetric or asymmetric. The processor 110 can include multiple processors, such as a system having multiple, physically separate processors in different sockets, or a system having multiple processor cores on a single physical chip. Similarly, the processor 110 can include multiple distributed processors located in multiple separate computing devices, but working together such as via a communications network. Multiple processors or processor cores can share resources such as memory 115 or the cache 112, or can operate using independent resources. The processor 110 can include one or more of a state machine, an application specific integrated circuit (ASIC), or a programmable gate array (PGA) including a field PGA.

The system bus 105 may be any of several types of bus structures including a memory bus or memory controller, a peripheral bus, and a local bus using any of a variety of bus architectures. A basic input/output (BIOS) stored in ROM 120 or the like, may provide the basic routine that helps to transfer information between elements within the computing device 100, such as during start-up. The computing device 100 further includes storage devices 130 or computer-readable storage media such as a hard disk drive, a magnetic disk drive, an optical disk drive, tape drive, solid-state drive, RAM drive, removable storage devices, a redundant array of inexpensive disks (RAID), or hybrid storage device. The storage device 130 can include software modules 132, 134, 136 for controlling the processor 110. The system 100 can include other hardware or software modules. The storage device 130 is connected to the system bus 105 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 110, bus 105, display 135, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 110 executes instructions to perform "operations", the processor 110 can perform the operations directly and/or facilitate, direct, or cooperate with another device or component to perform the operations.

Although the exemplary embodiment(s) described herein employs the hard disk, other types of computer-readable storage devices which can store data that are accessible by a computer, such as magnetic cassettes, flash memory cards, digital versatile disks (DVDs), cartridges, random access memories (RAMs) 135, read only memory (ROM) 120, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 145 represents any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 110. The functions these blocks represent may be provided through the use of either shared or dedicated hardware, including, but not limited to, hardware capable of executing software and hardware, such as a processor 110, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 120 for storing software performing the operations described below, and random access memory (RAM) 135 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 110 to perform particular functions according to the programming of the module. For example, FIG. 1 illustrates three modules Mod1 132, Mod2 134 and Mod3 136 which are modules configured to control the processor 110. These modules may be stored on the storage device 130 and loaded into RAM 135 or memory 115 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 110 can include all types of processors disclosed herein, including a virtual processor. However, when referring to a virtual processor, the processor 110 includes the software components associated with executing the virtual processor in a virtualization layer and underlying hardware necessary to execute the virtualization layer. The system 100 can include a physical or virtual processor 110 that receive instructions stored in a computer-readable storage device, which cause the processor 110 to perform certain operations. When referring to a virtual processor 110, the system also includes the underlying physical hardware executing the virtual processor 110.

Figure 2:
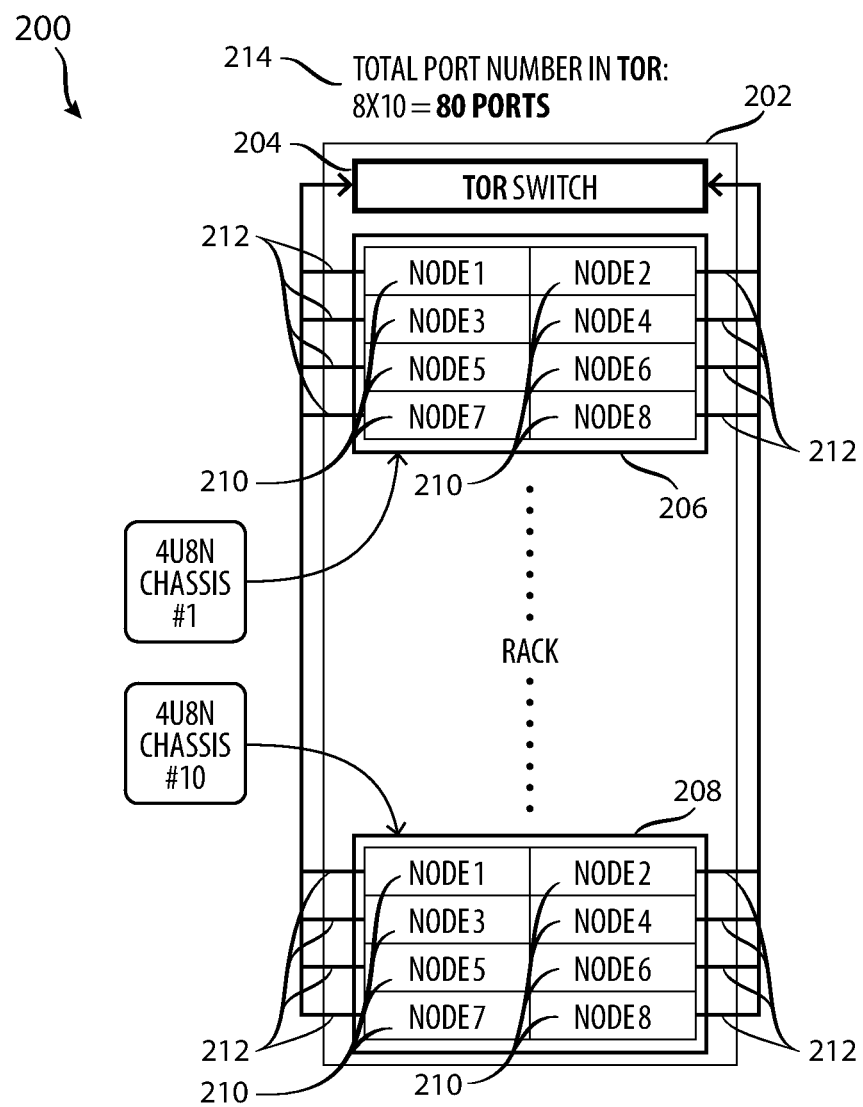
FIG. 2 illustrates a first TOR management port configuration.

Having disclosed some components of a computing system, the disclosure now turns to FIG. 2, which illustrates a first TOR management port configuration 200. In this example configuration 200, the TOR rack has not been configured according to the principles described herein. Instead, the rack 202 has a TOR switch 204 and ten multi-node chassis 206, 208. Each multi-node chassis in this example configuration 200 is four units high and contains eight nodes, and can therefore be referenced as a "4U8N" chassis. However, in other configurations and embodiments, other types of multi-node chassis (such as a 2U16N or a 5U5N) can be used. Each node 210 of each multi-node chassis illustrated requires a separate connection 212 to the TOR switch 204, resulting in eight required connections 212 per multi-node chassis. With ten multi-node chassis 206, 208 within the rack 202, this means the total number of ports required in the TOR switch is at least eighty (214), with eighty connections 212 (cables or other wiring), one for each node 210 in each chassis. As can be apparent, improvements can be made to this complicated use of so many connections.

Figure 3:
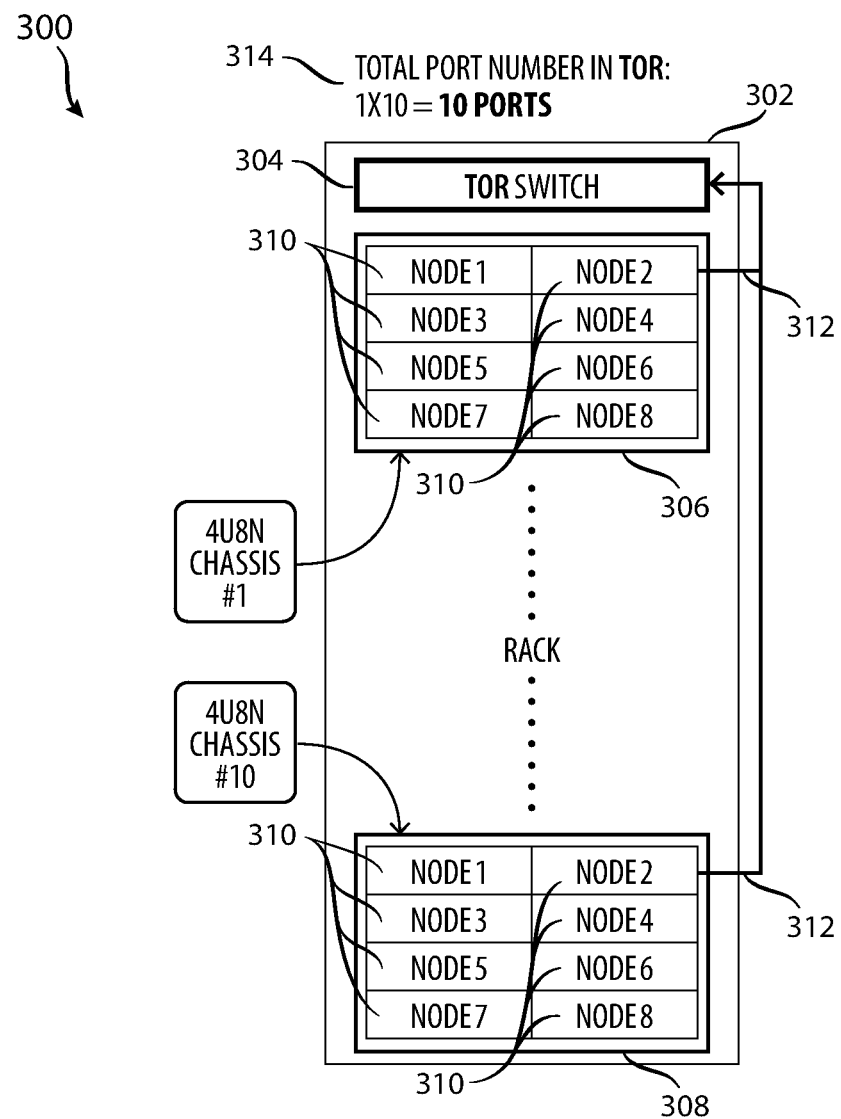
FIG. 3 illustrates a second TOR management port configuration.

FIG. 3 illustrates a second TOR management port configuration 300. In this example configuration 300, the TOR rack has been configured according to the principles described herein. As in FIG. 2, the rack 302 contains a TOR switch 304 and ten multi-node chassis 306, 308. Each of the multi-node chassis 306, 308 illustrated is a 4U8N chassis. However, in other configurations and embodiments, other types of multi-node chassis (such as a 6U12N or a 5U5N) can be used. Unlike the FIG. 2 example, each individual multi-node chassis 306, 308 has a single connection 312 to the TOR switch 304, reducing the number of connections 312 to (and ports required by) the TOR switch 304. In this example configuration 300, the total number of ports required by the TOR switch is ten 314 (one port for each of the ten multi-node chassis 306, 308) in the rack 302.

The ability to use a single connection from each multi-node chassis 306, 308 can be enabled, for example, using in-chassis routing. Such routing can be accomplished using a standard IPMI (Intelligent Platform Management Interface) utility, such as IPMItool. IPMItool is a command prompt, which can be used to manage IPMI-enabled devices. IPMItool can help in managing the system hardware components, monitoring the system health independent of the operating system. The IPMI specification describes four reserved bits in the IPMI Request Data channel-number description for the Get NetFn Support Command. (see Table 21-2 of the Intelligent Platform Management Interface Specification Second Generation version 2.0, incorporated herein by reference). Systems configured as described herein can use the reserved bits to communicate with specific nodes in the multi-node chassis. If the system were using the four reserved bits for addressing individual nodes in each multi-node chassis, this would put the maximum number of nodes/chassis at 16 ($2^4$), with the four bits creating a Node/BMC Identification.

Figure 4:
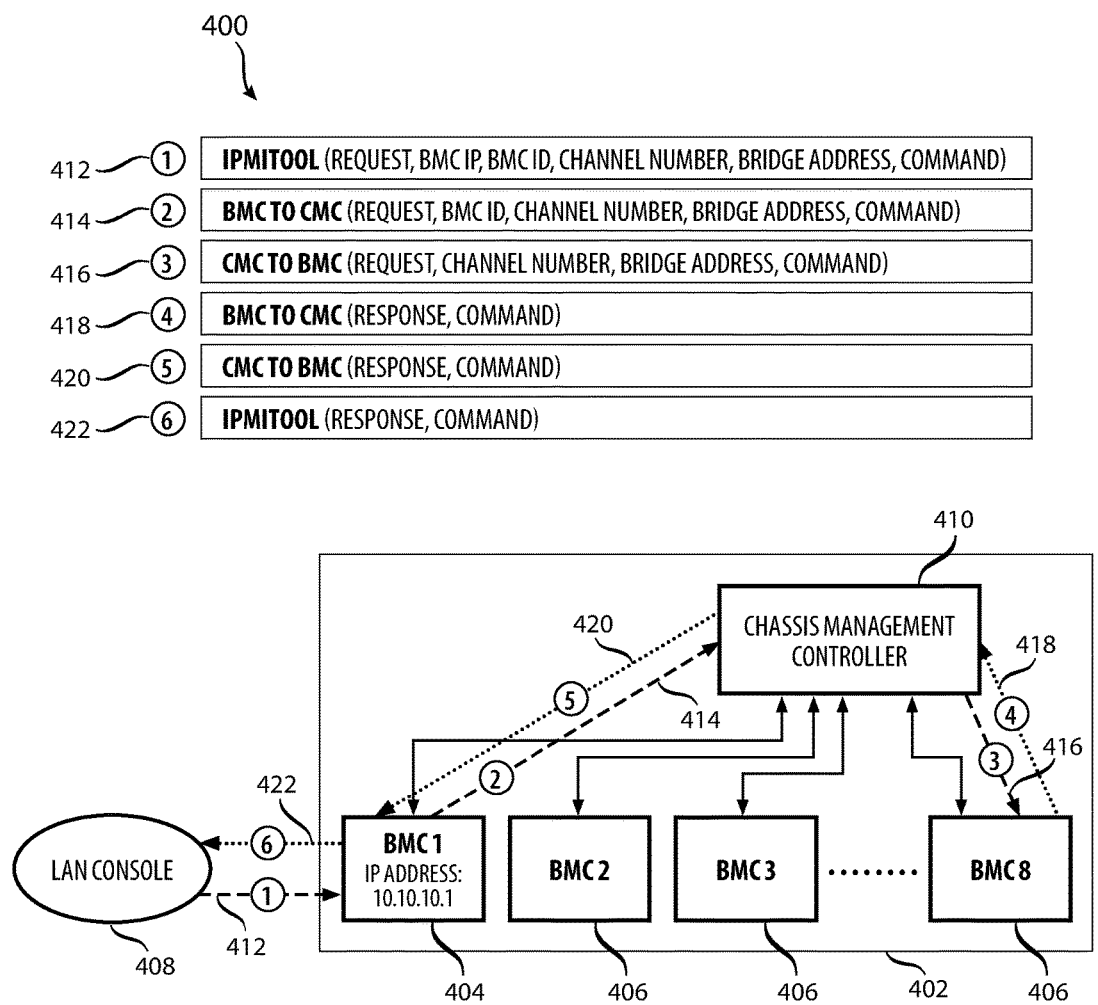
FIG. 4 illustrates a first exemplary communication path.

FIG. 4 illustrates a first exemplary communication path 400. In this communication path 400, a LAN console 408 is making a request/communicating with a specific node (BMC 8) in a multi-node chassis 402. Each of the nodes 404, 406 in the multi-node chassis 402 have addresses within the chassis, with a chassis management controller 410 directing communications using the addresses of the specific nodes. The multi-node chassis has an IP address corresponding to a single node 404 (BMC 1). As the communication goes from the LAN console 408 to the communication node 404 for the chassis, then to the chassis management controller 410, and to the specific node 406 for whom the communication is intended, the amount of information being communicated is gradually reduced (as illustrated with the communications 412, 414, 416, 418, 420, and 422). Consider the following example.

When the LAN console 408 communicates with a specific node (such as, in this example, BMC 8), the LAN console 408 sends a first communication (1) 412 to the designated BMC 404 which receives communications for the chassis 402. The first communication (1) 412 can include: a request for data, a BMC IP address corresponding to the communication node 404 for the chassis 402, a BMC ID address corresponding to the specific BMC node in the chassis for which the request is intended, a channel number and/or a bridge address used to communicate with the specific BMC node, and/or a command. The communication node 404 receives the first communication (1) 412, and then forwards the request, BMC ID, channel number, bridge address, and/or command as a second communication (2) to the chassis management controller 410.

The chassis management controller 410 can identify, based on the BMC ID, to which of the nodes within the multi-node chassis 402 the request is directed. Specifically, the chassis management controller 410 can compare the BMC ID received in the second communication (2) with a table or list of available node addresses corresponding to the nodes/baseboard management controllers 404, 406 within the multi-node chassis 402. Upon identifying the node for which the communication is intended, the chassis management controller 410 forwards the request, channel number, bridge address, and/or command to the identified node (in this example, BMC 8) as a third communication (3) 416. The identified node then performs according to the message received. If the message were a request for data, the identified node can communicate a response communication (4) 418 to the chassis management controller 410, the response communication 418 having a response to the original request and/or a command. The chassis management controller 410 can then route the response communication to the communication node 404 for the chassis 402 as a fifth communication (5) 420, which the communication node 404 can then forward to the LAN console 408 as a sixth communication (6) 422.

It is noted that the exemplary communications (412, 414, 416, 418, 420, and 422), and the specific data in the communications, can vary. For example, in some configurations, the requests for data can contain additional instructions or information. Likewise, in some situations, the communication can be an instruction to store data, or communicate with a third node, and the specific data path associated any communication can vary. Communications 412, 422 between the LAN console 408 and the communication node 404 can be performed using IPMItool (or similar communication utility). Communications 414, 416, 418, 420 internal to the multi-node chassis can occur via cabling (such as a wired Ethernet/bus connection), or via fiber optics.

In some configurations, rather than having communications route through a designated communications node 404, the system can have all communications routed through the chassis management controller 410. In such configurations, communications directed to the IP address for the multi-node chassis would then be first received by the chassis management controller 410, then forwarded to the individual baseboard management controllers/nodes 404, 406 per the BMC Identifications in the communications.

Figure 5:
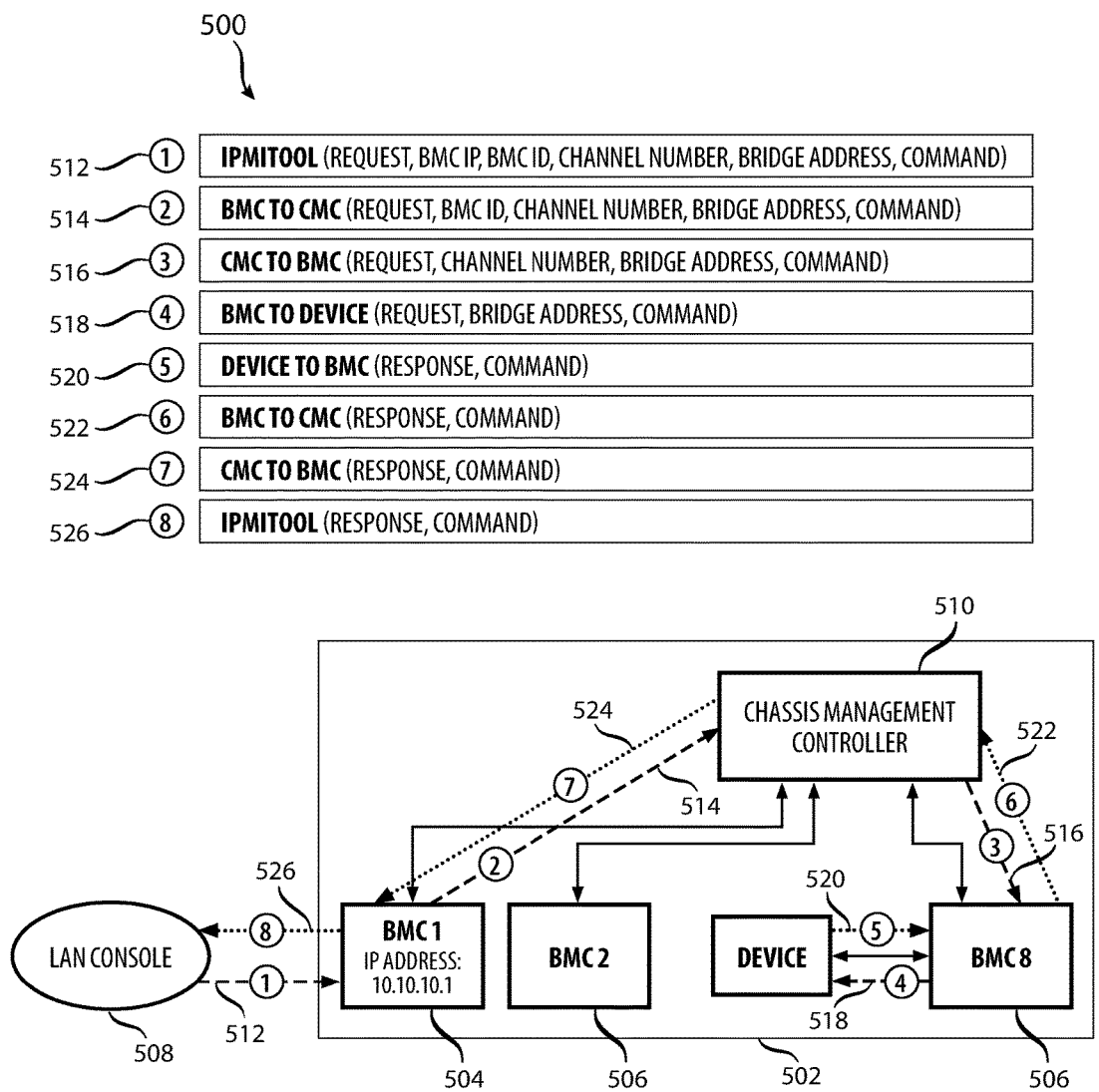
FIG. 5 illustrates a second exemplary communication path.

FIG. 5 illustrates a second exemplary communication path 500. This second exemplary communication path 500 is similar to the communication path of FIG. 4, while further illustrating the final node/baseboard management controller (BMC 8) communicating with a separate device. When the LAN console 508 communicates with a device via a specific node (such as, in this example, BMC 8), the LAN console 508 sends a first communication (1) 512 to a designated BMC 504 which receives communications for the chassis 502. The first communication (1) 512 can include: a request for data, a BMC IP address corresponding to the communication node 504 for the chassis 502, a BMC ID address corresponding to the specific BMC node in the chassis for which the request is intended, a channel number and/or a bridge address used to communicate with the specific BMC node, and/or a command. The communication node 504 receives the first communication (1) 512, and then forwards the request, BMC ID, channel number, bridge address, and/or command as a second communication (2) to the chassis management controller 510.

The chassis management controller 510 can identify, based on the BMC ID, to which of the nodes within the multi-node chassis 502 the request is directed. Specifically, the chassis management controller 510 can compare the BMC ID received in the second communication (2) with a table or list of available node addresses corresponding to the nodes/baseboard management controllers 504, 506 within the multi-node chassis 502. Upon identifying the node for which the communication is intended, the chassis management controller 510 forwards the request, channel number, bridge address, and/or command to the identified node (in this example, BMC 8) as a third communication (3) 516. The identified node then communicates with the device via a fourth communication (4) 518, and the device performs according to the message 518 received. If the message 518 were a request for data, the identified node can communicate a response communication (5) 520 to the identified node (such as BMC 8), the response communication 520 having a response to the original request and/or a command. The identified node can forward the response communication to the chassis management controller 510 (the sixth communication (6) 522, which can then route the response communication to the communication node 504 for the chassis 502 as a seventh communication (7) 524, which the communication node 504 can then forward to the LAN console 508 as a eighth communication (8) 526.

Having disclosed some basic system components and concepts, the disclosure now turns to the exemplary method embodiment shown in FIG. 6. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

A system 100 configured according to this controller can receive, at a chassis management controller of a multi-node chassis within a server rack, a first communication, wherein the first communication is received from a first baseboard management controller in a plurality of baseboard management controllers within the multi-node chassis (602). The system 100 can then communicate, from the chassis management controller to a second baseboard management controller in the plurality of baseboard management controllers, a second communication. The second communication can be based on the first communication. The second baseboard management controller can also be distinct from the first baseboard management controller (604). Alternatively, the first and second BMC can be the same BMC. The system 100 can receive, at the chassis management controller, in response to the second communication and from the second baseboard controller, a response to the second communication (606) and communicate the response from the chassis management controller to the first baseboard management controller (608).

The first communication can be based on a local area network request received from a local area network console, where the local area network console communicates with the plurality of baseboard management controllers exclusively through the first baseboard management controller within the multi-node chassis. In such circumstances, the local area network request can have one or more of: a data request, a baseboard management controller IP address corresponding to the first baseboard management controller, a baseboard management controller node identification corresponding to the second baseboard management controller, a baseboard management controller intelligent platform management interface channel number, a target device I2c address, and a command.

In certain configurations, the second baseboard management controller can send a request to a device, the request based on the second communication, where the response is generated at the device in response to the request. In some configurations, the server rack can have a plurality of multi-node chassis, where each multi-node chassis in the plurality of multi-node chassis has a single baseboard management controller which communicates with a local area network console.

The first communication and the second communication can have a baseboard management controller identification corresponding to the second baseboard management controller, and the baseboard management controller identification can use reserved intelligent platform management interface bits. For example, the baseboard management controller identification can be one, two, three, or four bits long. In other configurations, where BMC identification can be more than four bits long.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can apply to any top-of-rack server configuration. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
   receiving, at a first baseboard management controller of a plurality of baseboard management controllers within the multi-node chassis, a request from a console via a first communication channel, the request including information of identification of a specific baseboard management controller of the plurality of baseboard management controllers;
   receiving, at a chassis management controller of the multi-node chassis within a server rack, a first communication, wherein the first communication is received from the first baseboard management controller;
   communicating, from the chassis management controller to the specific baseboard management controller, a second communication, wherein the second communication is based on the first communication, and wherein the specific baseboard management controller is distinct from the first baseboard management controller;
   receiving, at the chassis management controller, in response to the second communication and from the specific baseboard controller, a response to the second communication;
   communicating the response from the chassis management controller to the first baseboard management controller; and
   communicating the response from the first baseboard management controller to the console via the first communication channel,
   wherein the first communication and the second communication comprise a baseboard management controller identification corresponding to the specific baseboard management controller, the baseboard management controller identification corresponding to reserved intelligent platform management interface bits.

2. The method of claim 1, wherein the first communication is based on a local area network request received from a local area network console, and wherein the local area network console communicates with the plurality of baseboard management controllers exclusively through the first baseboard management controller within the multi-node chassis.

3. The method of claim 2, wherein the local area network request comprises one or more of:
   a data request;
   a baseboard management controller IP address corresponding to the first baseboard management controller;
   a baseboard management controller node identification corresponding to the specific baseboard management controller;
   a baseboard management controller intelligent platform management interface channel number;
   a target device I2c address; and
   a command.

4. The method of claim 1, wherein the specific baseboard management controller sends a request to a device, the request being based on a specific communication; and
   wherein the response is generated at the device in response to the request.

5. The method of claim 1, wherein the server rack comprises a plurality of multi-node chassis, wherein each multi-node chassis in the plurality of multi-node chassis has a single baseboard management controller which communicates with a local area network console.

6. The method of claim 1, wherein the baseboard management controller identification is one to four bits long.

7. A system comprising:
   a first baseboard management controller of a plurality of baseboard management controllers within a server rack;
   and a chassis management controller, wherein the chassis management controller is configured to perform operations comprising:
    receiving, at the first baseboard management controller, a request from a console via a first communication channel, the request including information of identification of a specific baseboard management controller of the plurality of baseboard management controllers;
    receiving a first communication, wherein the first communication is received from the first baseboard management controller;
    communicating, from the chassis management controller to the specific baseboard management controller, a second communication, wherein the second communication is based on the first communication;
    receiving, at the chassis management controller, in response to the specific communication and from the specific baseboard controller, a response to the second communication;
    communicating the response from the chassis management controller to the first baseboard management controller; and
communicating the response from the first baseboard management controller to the console via the first communication channel,
    wherein the first communication and the second communication comprise a baseboard management controller identification corresponding to the specific baseboard management controller, the baseboard management controller identification corresponding to reserved intelligent platform management interface bits.

8. The system of claim 7, wherein the first communication is based on a local area network request received from a local area network console, and wherein the local area network console communicates exclusively with the first baseboard management controller.

9. The system of claim 8, wherein the local area network request comprises one or more of:
    a data request;
    a baseboard management controller IP address corresponding to the first baseboard management controller;
    a baseboard management controller node identification corresponding to the specific baseboard management controller;
    a baseboard management controller intelligent platform management interface channel number;
    a target device I2c address; and
    a command.

10. The system of claim 7, wherein the specific baseboard management controller sends a request to a device, the request being based on the specific communication; and
    wherein the response is generated at the device in response to the request.

11. The system of claim 9, wherein the baseboard management controller identification is one to four bits long.

12. A computer-readable storage device having instructions stored which, when executed by a computing device, cause the computing device to perform operations comprising:
    receiving, at a first baseboard management controller of a plurality of baseboard management controllers within a multi-node chassis, a request from a console via a first communication channel, the request including information of identification of a specific baseboard management controller of the plurality of baseboard management controllers;
    receiving, at a chassis management controller of the multi-node chassis within a server rack, a first communication, wherein the first communication is received from the first baseboard management controller;
    communicating, from the chassis management controller to the specific baseboard management controller, a second communication, wherein the second communication is based on the first communication, and wherein the specific baseboard management controller is distinct from the first baseboard management controller;
    receiving, at the chassis management controller, in response to the second communication and from the specific baseboard controller, a response to the second communication;
    communicating the response from the chassis management controller to the first baseboard management controller; and
    communicating the response from the first baseboard management controller to the console via the first communication channel,
    wherein the first communication and the second communication comprise a baseboard management controller identification corresponding to the specific baseboard management controller, the baseboard management controller identification corresponding to reserved intelligent platform management interface bits.

13. The computer-readable storage device of claim 12, wherein the first communication is based on a based on a local area network request received from a local area network console, and wherein the local area network console communicates exclusively with the first baseboard management controller.

14. The computer-readable storage device of claim 13, wherein the local area network request comprises one or more of:
    a data request; a baseboard management controller IP address corresponding to the first baseboard management controller;
    a baseboard management controller node identification corresponding to the second baseboard management controller;
    a baseboard management controller intelligent platform management interface channel number;
    a target device I2c address; and
    a command.

15. The computer-readable storage device of claim 12, wherein the second baseboard management controller sends a request to a device, the request being based on the second communication; and
    wherein the response is generated at the device in response to the request.

16. The computer-readable storage device of claim 12, wherein the baseboard management controller identification is one to four bits long.

\* \* \* \* \*